United States Patent [19]

Hose

[11] 4,204,210
[45] May 20, 1980

[54] SYNTHETIC ARRAY RADAR COMMAND AIR LAUNCHED MISSILE SYSTEM

[75] Inventor: Eddy Hose, Fullerton, Calif.

[73] Assignee: The United States of America as represented by the Secretary of the Air Force, Washington, D.C.

[21] Appl. No.: 288,243

[22] Filed: Sep. 15, 1972

[51] Int. Cl.² ............................................. G01S 9/02
[52] U.S. Cl. .................................. 343/6 R; 343/5 CM; 343/16 M
[58] Field of Search .................... 343/16 M, 6 R, 7.4, 343/5 CM

[56] References Cited

U.S. PATENT DOCUMENTS

| | | | |
|---|---|---|---|
| 3,201,788 | 8/1965 | Hertwig | 343/7.4 |
| 3,307,179 | 2/1967 | Verbarg | 343/6 R |
| 3,579,239 | 5/1971 | Porcell, Jr. et al. | 343/16 M |
| 3,631,485 | 12/1971 | Beazell, Jr. | 343/6 R |
| 3,774,202 | 11/1973 | Nolette | 343/5 CM |
| 3,848,253 | 11/1974 | Genuist et al. | 343/5 CM |

Primary Examiner—T. H. Tubbesing
Attorney, Agent, or Firm—Joseph E. Rusz; Julian L. Siegel

[57] ABSTRACT

A missile guidance system in which a synthetic array radar antenna control system correlates the phase and doppler frequency information contained in signals received by a four quadrant antenna from an illuminated section of terrain, so as to compute the velocity components of the antenna. The velocity components are utilized, in conjunction with the earth rate supplied from a terrestrial navigation system, to maintain the azimuth null plane of the antenna in alignment with a selected target designated by means of a synthetic array map of the illuminated terrain. A missile command system controls the flight path of missile along the azimuth null plane to the target.

2 Claims, 10 Drawing Figures

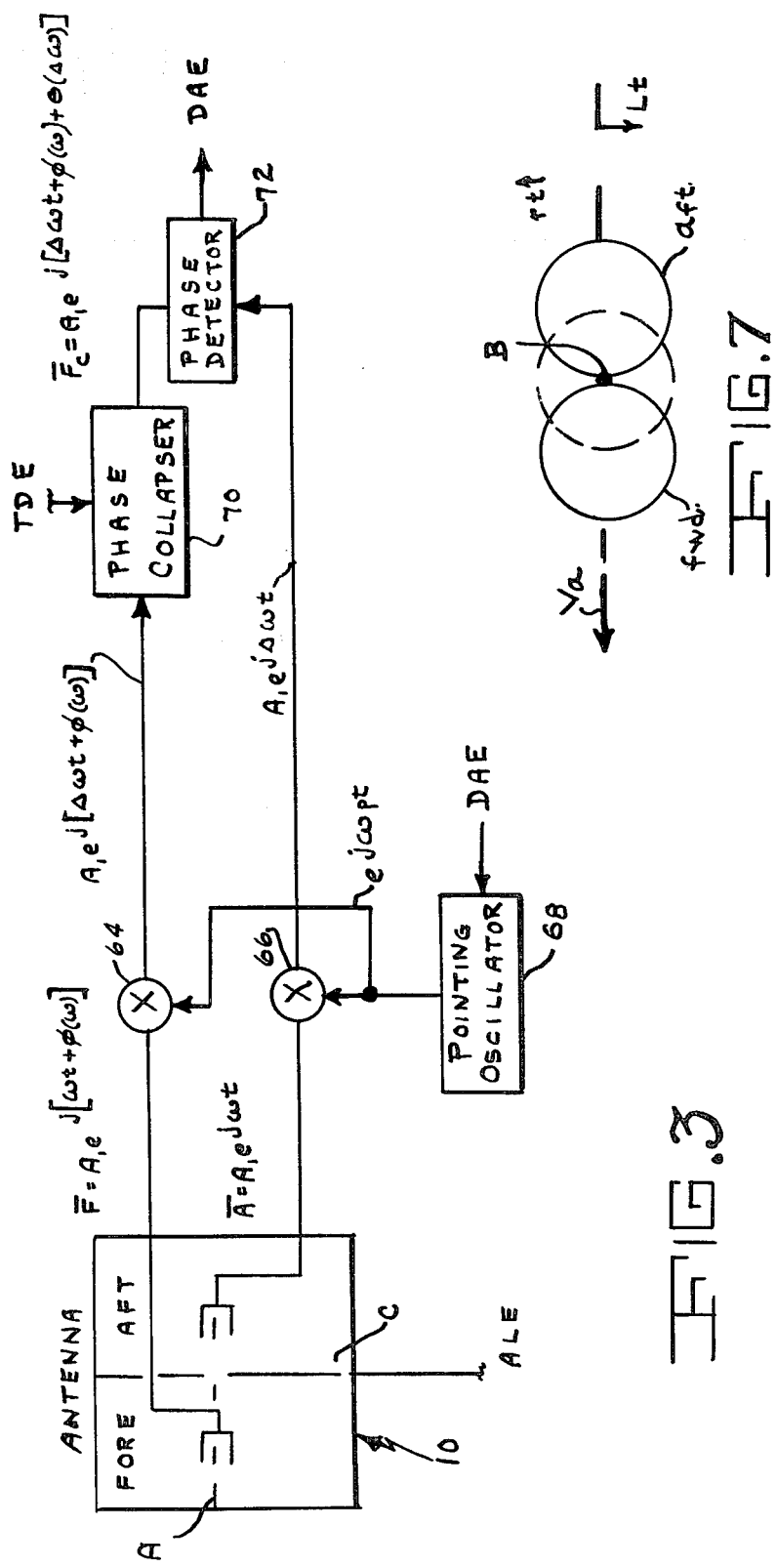

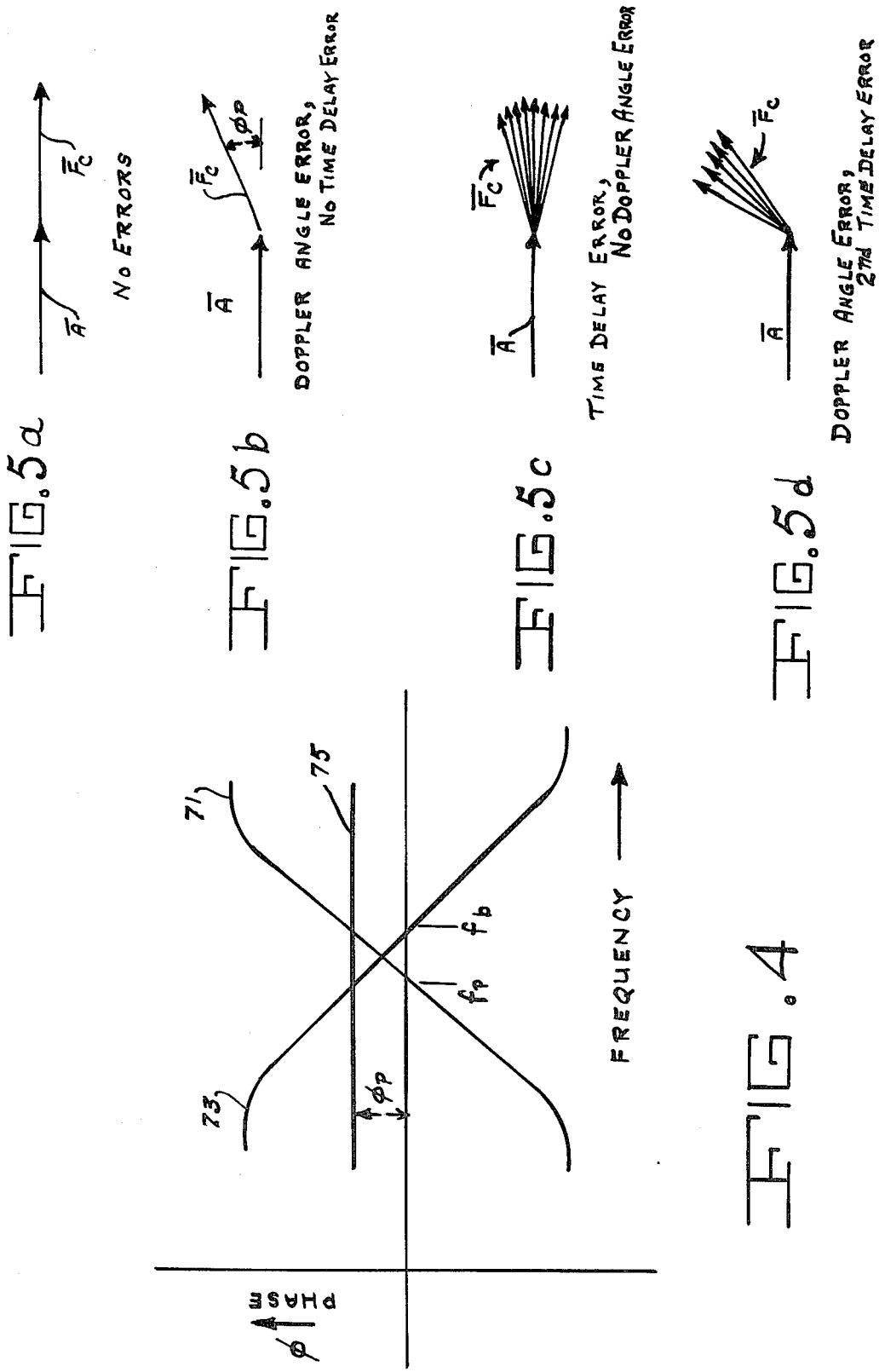

SYNTHETIC ARRAY RADAR COMMAND AIR LAUNCHED MISSILE SYSTEM

BACKGROUND OF THE INVENTION

This invention relates to missile navigation, and more particularly to an improvement in the Synthetic Array Radar Command Air Launched Missile.

The Synthetic Array Radar Command Air Launched Missile (SARCALM), as its name implies, is designed to deliver a missile to a ground target located on a synthetic array radar map. The synthetic array radar consists of a coherent transmitter and receiver, a synthetic array processor and display, and a velocity sensor and motion compensation whose function is to focus the map for the length of a synthetic array. The target is located on the map in the time-frequency coordinates. SARCALM guides the missile to a point whose time-frequency coordinates match those of the target.

Guiding the missile to match the time coordinates of the target is straightforward. Guiding the missile to the doppler coordinate of the target cannot be done directly. This is because the missile is in motion with respect to the target. SARCALM overcomes this problem by means of a coordinate transformation. The direction cosine from an interferometer antenna to the missile is readily measured. The direction cosine from the antenna to the target can be derived from its doppler frequency. Thus, guidance in the frequency coordinate is replaced by guidance in the direction cosine coordinate.

An iso-range surface is a sphere; an iso-doppler surface is a cone. The interferometer antenna boresight plane matches the iso-doppler surface at the vicinity of the target. All surfaces are centered at the radar antenna. A missile launched from the aircraft flies at a constant altitude in the direction of the boresight plane. Upon approaching the target's range the missile starts to dive. A two-axis direction finding antenna on the missile points the missile yaw axis in the direction of the radar. An inertial sensor points the roll axis of the missile in the direction of local vertical. As a result, pitch maneuvers correct the range while yaw maneuvers correct the direction cosine. The intersection of a sphere and a plane is a circle. The missile is guided along this circular course until it collides with the target. Thus, what is inherently a three-dimensional guidance problem is solved in the two dimensions of the synthetic array radar.

Theoretically, the translation of the doppler frequency of the target to its direction cosine from the interferometer antenna can be done by direct computations. This, however, requires that pertinent parameters be known to an accuracy commensurate with the required guidance precision. Thus, the velocity vector $\vec{V}$ needs to be known to an accuracy commensurate with the resolution of the synthetic array radar. Furthermore, the mechanical direction of the antenna boresight plane needs to be known to the same accuracy and the electrical boresight needs to coincide with it.

Satisfying the necessary conditions for pointing by computation is at present impractical. Therefore, SARCALM resorts to pointing by angle tracking the radar returns from the target. These returns are identified with information generated by the synthetic array map. In synthetic array mapping the velocity vector is used to focus the map in the time-frequency domain for the duration of an array time. This can be done with a relatively low accuracy sensor provided it can precisely sense velocity changes. Furthermore, with target angle tracking it is not necessary to calibrate the direction of the antenna boresight axis either absolutely or in relation to the electrical null. This is because both the target and the missile signals undergo the same distortions in the antenna and have the same electrical null.

The pointing oscillator designates the direction of the target. Tracking the returns from this direction with the interferometer points the electrical null at the target. In this case the doppler angle error is proportional to the angle between the azimuth null axis and the target azimuth.

A null command generator, as its name implies, senses the doppler angle error and drives it to zero by pointing the electrical null to the target azimuth. The pointing accuracy is a function of the signal to noise ratio. The signal to noise ratio is enhanced by estimating the doppler angle error from the total clutter rather than just the target return. The best estimate is obtained by a process which aggregates the individual estimate of each independent scatterer on the terrain.

SUMMARY OF THE INVENTION

The present invention simplifies the navigation system and combines the motion compensation of a null command generator and functions as a single unit, which is an improvement over the former SARCALM which requires a highly advanced initial navigational system for motion compensation in which a target is located on the SAR map and its frequency is determined and a beam is pointed in the direction of the target by the null command generator.

It is an object of the invention to provide a SARCALM system which has improved motion sensing over initial parameters in the baseline system.

It is another object to provide a SARCALM system which has improved doppler processing.

It is still another object to provide a SARCALM system which provides improved focusing and vectoring computing methods.

It is still a further object to provide a SARCALM system for the synthetic array radar and missile guidance.

These and other advantages, features and objects of the invention will become more apparent from the following description taken in connection with the illustrative embodiment in the accompanying drawings, wherein:

BRIEF DESCRIPTION OF DRAWINGS

FIG. 3 is a simplified block diagram for explaining the operation of the single beam velocimeter shown in FIG. 2;

FIG. 4 is a diagram of signal phase versus frequency for explaining the "collapsing" function of the single beam velocimeter of FIG. 2;

FIGS. 5a, 5b, 5c and 5d are phase diagrams of forward and aft signal spinors for further explaining the operation of the single beam velocimeter shown in FIG. 2;

FIG. 7 is a diagram of the different transmitted beam positions for explaining the beam squinting technique utilized in the system of FIG. 1.

DETAILED DESCRIPTION OF THE PREFERRED EMBODIMENT

Figure 1:
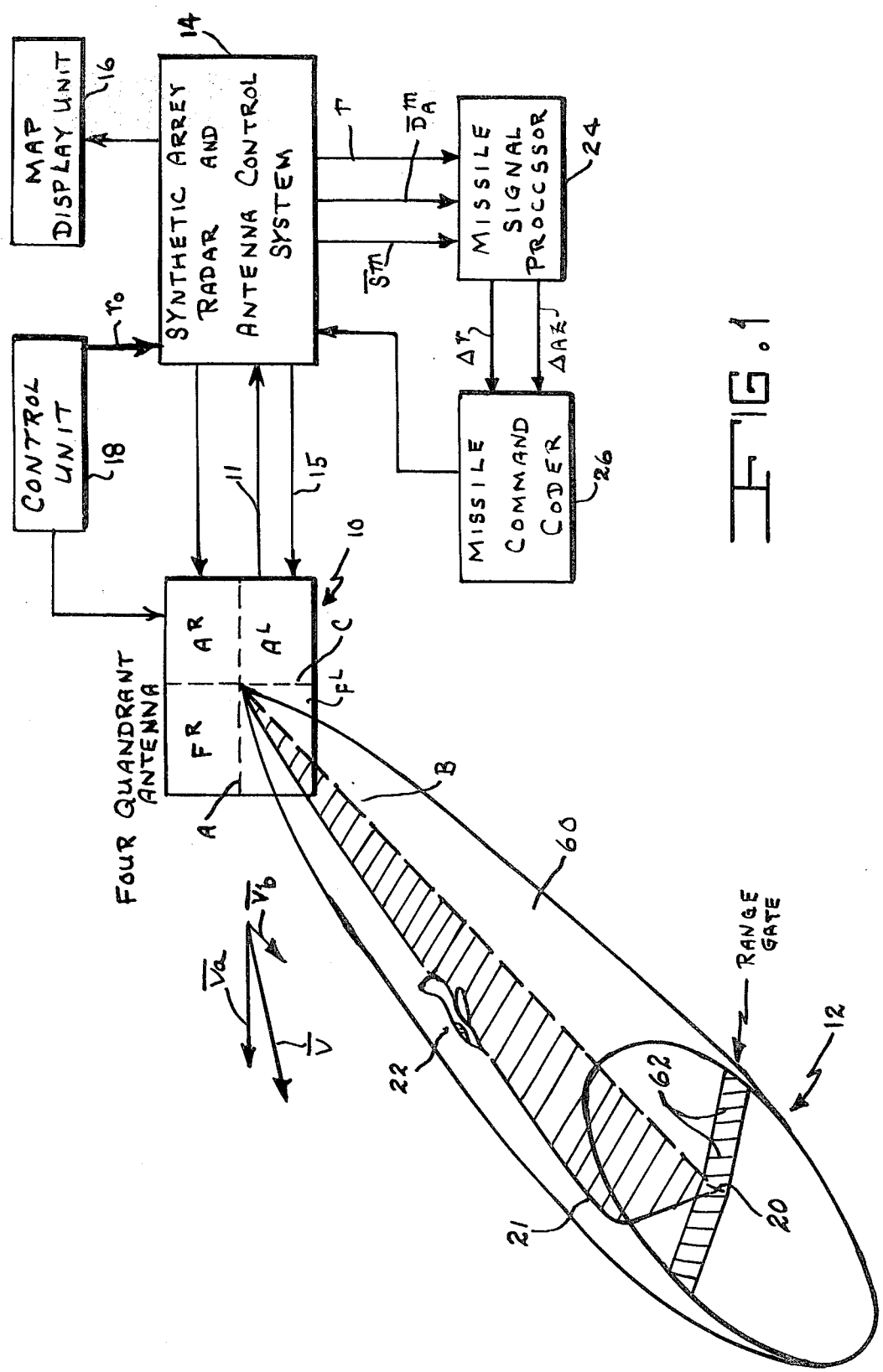
FIG. 1 is a block diagram of a missile guidance system in accordance with the invention.

The modified synthetic array radar command air launch missile system (SARCALM) of FIG. 1 is adapted to be carried by an airborne vehicle (not shown). A four-quadrant antenna 10 illuminates a designated section of terrain 12 with RF energy; and the sum and the two difference received signals are coupled through composite channels 11 to synthetic array radar and antenna control system 14. System 14 provides data for a synthetic array map of the illuminated terrain, and this data is displayed by a map display unit 16.

In the initial acquisition mode of operation, the operator uses control unit 18 to position the image of a target 20 at the center of the display on unit 16. Control unit 18 provides output signals to the antenna assembly 10 to cause the antenna to be positioned such that target 20 is centered on the display in the azimuth direction. Unit 18 also provides an initial range signal $r_o$ to synthetic array radar and antenna control system 14, to cause the target to be centered on the display in the range dimension.

The synthetic array radar and antenna control system 14 maintains the image of the target 20 centered on the display, and the antenna boresight axis (B) aligned with target 20.

Synthetic array radar and antenna control system 14 also provides the received sum ($\bar{S}^m$) and the azimuth difference ($\bar{D}_A{}^m$) signals originating from a transponder (not shown) on missile 22, to a missile signal processor 24. A range signal (r), which is compensated for the motion of the vehicle relative to the target, is also applied to processor 24 from system 14. The missile signal processor computes a $\Delta AZ$ signal which is indicative of the deviation of the missile's flight path from azimuth boresight plane 21 of antenna 10; and a $\Delta r$ signal which is representative of the difference in range between the missile and target 20. The signals $\Delta r$ and $\Delta AZ$ are encoded within missile command coder 26 and applied through system 14 as a modulation of the transmitted signal applied to antenna 10 through transmitting channel 15. The modulation on the transmitted signal is decoded by systems on missile 22 and utilized to steer the missile along azimuth boresight plane 21 until the missile approaches the range of target 20; at which time the missile is commanded to dive into the target.

Figure 2:
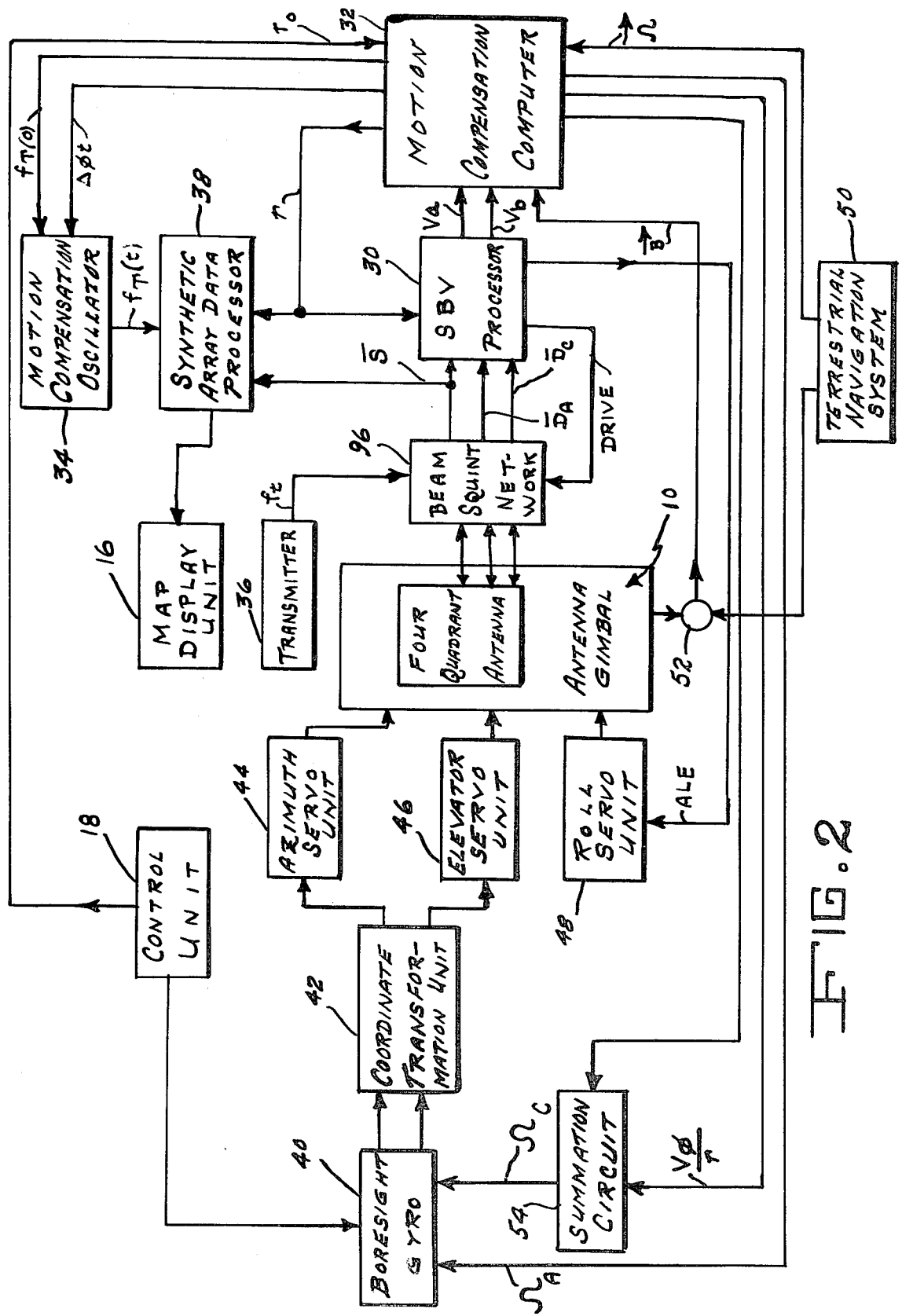
FIG. 2 is a block diagram showing a portion of the system of FIG. 1 in greater detail.

FIG. 2 is a more detailed block diagram of the system of FIG. 1, exclusive of processors 24 and 26. As shown in FIG. 2, a single beam velocimeter (SBV) processor 30 uses the sum ($\bar{S}$) and two difference signals ($\bar{D}_A$ and $\bar{D}_C$) from antenna 10 to compute the velocity components ($V_a$ and $V_b$) of the antenna. The signal $\bar{D}_A$ is formed by combining the output signal from antenna 10 according to the expression $(\bar{F}^R + \bar{F}^L) - (\bar{A}^R + \bar{A}^L)$; and $\bar{D}_C$ is formed by combining the output signals from antenna 10 according to expression $(\bar{F}^R + \bar{A}^R) - (\bar{F}^L + \bar{A}^L)$, (See FIG. 1). Hence the interferometer having its phase centers along the A axis provides angle information in azimuth.

As will be explained subsequently, antenna 10 is controlled such that its A axis is in a plane defined with the flight vector ($\vec{V}$) and the boresight axis, B (see FIG. 1). With the antenna so aligned the SBV processor 30 (FIG. 2) provides the values of velocity terms $V_a$ and $V_b$.

A motion compensation computer 32 uses $V_b$ to compute a signal $f_{T(O)}$ which is applied as one control signal to a motion compensation oscillator 34. The signal $f_T(O)$ is indicative of the initial motion compensation frequency and is updated by the term $\Delta\phi(t)$. $f_{T(O)}$ is defined as $$f_{T(O)} = \frac{2V_{bo}}{\lambda} \text{ and } \Delta\phi(t) = \int_o^t \frac{2(V_b - V_{bo})}{\lambda} dt;$$

where $V_{bo}$ is the velocity along the antenna boresight axis at some initial time $t_o$, and $V_b$ is the velocity at some later time t. $f_t$ and $\lambda$ are the frequency and wavelength, respectively, of the signal from transmitter 36.

The output signal from motion compensation oscillator 34 $f_{T(t)}$, which is proportional to $f_{T(O)} + \Delta\phi(t)$, is applied to synthetic data array processor 38 to focus the synthetic array map. Processor 38 may be any suitable conventional synthetic array data processor.

Motion compensation computer 32 also uses the signals $V_a$ and $V_b$ to produce a signal r which is the range to target 20 (FIG. 1), continuously updated to compensate for the relative motion between the antenna and the target. Signal r is applied to processors 30 and 38 to synchronize the range gating operations performed therein.

During initial target acquisition, the antenna 10 is positioned by signals from control unit 18 applied to boresight gyro assembly 40. The output signals from assembly 40 are processed through coordinate transformation unit 42 and then applied to azimuth and elevation servo units 44 and 46. Units 44 and 46 control the azimuth and elevation gimbals respectively of antenna 10. A roll servo unit 48 is controlled by an alignment error (ALE) signal supplied from SBV processor 30. The ALE signal controls the roll gimbal of antenna 10 such as to maintain the A axis of the antenna in the plane defined by the flight vector $\vec{V}$ and the boresight axis, B.

A terrestrial navigation system 50 provides attitude reference signals to a reference circuit 52 which computes the signal $\vec{B}$, the direction of the antenna boresight axis. Terrestrial navigation system 50 may be any suitable conventional inertial navigation system, doppler aided inertial navigation system or radio aided inertial navigation system, all of which are well known in the art. Terrestrial navigation system 50 provides attitude reference signals and computed earth rate signals. The attitude reference function is obviously inherent in each of the above-referenced navigation systems; the earth rate function is also inherent therein. For example, in inertial navigation units of the type used in aircraft, the spatially stabilized platform must be continuously torqued to maintain the platform in a predetermined relationship to the earth's gravity vector as the platform is transported above the earth. This is evident from the geometry of the problem; for example, if a platform which is spatially stabilized and aligned normal to the earth's gravity vector is moved a substantial distance around the earth, it must be torqued as a function of the rate of movement around the earth to maintain its predetermined alignment relative to the earth's gravity vector. Such a predetermined alignment is necessary to maintain the rate gyros in a known orientation so that the rate gyro signals may be used to determine distance and speed along each of the three cardinal directions. Hence, standard inertial navigation systems provide both the attitude reference signals and the earth rate signals which are required by the invention. Signal $\vec{B}$ is fed to motion compensation computer 32 together with a signal $\vec{\Omega}$, which is the computed earth rate. The computer rotates $\vec{\Omega}$ into $\vec{B}$ and calculates $\vec{\Omega}_A$ and $\vec{\Omega}_C$. The quantity $V_{a/r}$ is added to $\vec{\Omega}_C$ the earth rate around the C axis in summation unit 54 and the output signal from unit 54 is used to precess boresight gyro 40 around the C axis. $\vec{\Omega}_A$ is used to precess boresight gyro 40 around the A axis. This precession maintains the boresight of antenna 10 trained on the center of the map—target 20.

The mechanization of SBV processor 30 can best be understood by first considering some of the basic concepts involved with its operation. As shown in FIG. 1, at each azimuth angle within beam 60 there are strips of terrain designated generally by numeral 62. Along each strip each individual scatterer reflects energy at the same doppler frequency. If antenna 10 is controlled (by the ALE signal) such that the A axis is in the plane defined by $\vec{V}$ and B, then each individual scatterer along any particular terrain strip 62 will also be at the same angle off boresight as every other scatterer along the same strip. Hence it is possible to impose a phase modulation on the received signals from antenna 10 such that the signals from all ground scatterers appear to originate from a preselected azimuth angle within the beam. Further, when this phase modulation function is mechanized with linear time delay such that the composite signal (spinors) from the forward and aft sections of the antenna are in phase, the condition of all signals having originated along azimuth boresight plane 21 is simulated. The value of the inserted time delay is indicative of the magnitude of the velocity $V_a$, and the frequency of a pointing oscillator used to down convert the received signals is indicative to a high degree of accuracy, of the magnitude of the velocity $V_b$.

Data from a plurality of ground segments (independent samples) are processed to produce control signals designated doppler angle error (DAE); time delay error (TDE) and alignment error (ALE) signals; which are used to control the frequency of the pointing oscillator, the phase collapsing time delay value, and the antenna's A axis alignment, respectively.

FIG. 3 is a simplified block diagram of the above outlined features of processor 30. In FIG. 3 the signals from the forward and aft sections of antenna 10 are designated $\vec{F} = A_1 e^{j[\omega t + \phi(\omega)]}$ and $\vec{A} = A_1 e^{j\omega t}$ respectively. Mixers 64 and 66 translate the signals $\vec{F}$ and $\vec{A}$ to a lower frequency range as indicated by the terms $A_1 e^{j[\Delta\omega t + \phi(\omega)]}$ and $A_1 e^{j\Delta\omega t}$ respectively; where $\Delta\omega = \omega - \omega_p$, and $\omega_p$ is the frequency of the pointing oscillator 68. The output signal from a phase collapser (time delay) device 70 is compared with the corresponding signal from the aft section of the antenna in a phase detector 72. The output signal from phase detector 72 is the DAE signal applied to pointing oscillator 68 to control its frequency in such a manner that the signals applied to phase detector 72 are in phase.

Although the notation associated with the explanation of the circuit of FIG. 3 was for a single frequency, it is understood that the phase modulation imposed by unit 70 can be set equal to the correct phase delay for all of the frequencies within the doppler information bandwidth. Therefore, since the correct relative phase rotation is applied to all of the received signal components from the forward (for example) antenna section regardless of their frequency, the output signals from time delay unit 70 may be considered to be "collapsed."

FIG. 4 illustrates in simplified form the relationship between the frequency $f_p$ of pointing oscillator 68 and the time delay function applied to forward signal spinor $\vec{F}$ by unit 70. A curve 71 depicts as a function of frequency, the phase difference between the phase spinors $\vec{F}$ and $\vec{A}$. It is noted that at the frequency $f_b$ of the azimuth null plane the phase difference is zero. A curve 73 depicts the phase versus frequency function imposed by collapser 70 (FIG. 3). For $f_p$ at some frequency other than the value of $f_b$, there is a net "flat" phase difference $\phi_p$ as shown by line 75. The time delay value (T) of collapser 70 is equal to the slope of the linear portion of curve 73. For the correct time delay function and with the frequency $f_p$ of pointing oscillator 68 equal to the frequency $f_b$ of the azimuth boresight plane; the phase relationship shown in FIG. 5a exists between the collapsed signal spinor $\vec{F}_C$ and the $\vec{A}$ signal spinor. If the frequency $f_p$ of pointing oscillator 68 is set to a value other than $f_b$, then the relative phase $\phi_p$ is applied to all components of the collapsed signal spinor $\vec{F}_C$, and the phase relationship shown in FIG. 5b exists between the $\vec{F}_C$ and A signal spinors. FIG. 5c illustrates the relative phase relationship between the collapsed signal spinor $\vec{F}_C$ and the $\vec{A}$ signal spinor when a time delay error condition exists; and FIG. 5d shows the phase relationship for both doppler angle error and a time delay error conditions.

Figure 6:
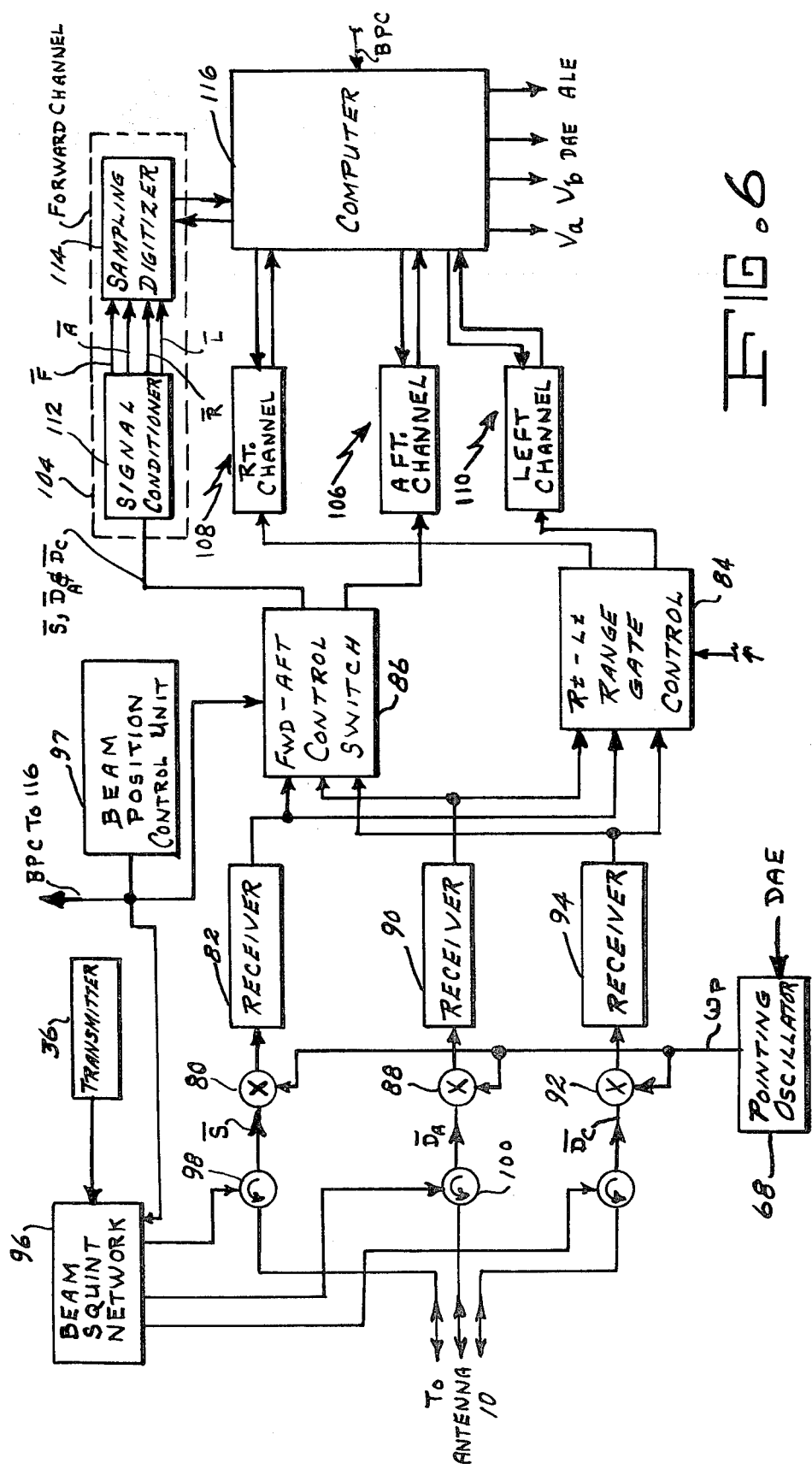
FIG. 6 is a more detailed block diagram of a single beam velocimeter of FIG. 2.

Processor 30 is shown in greater detail in FIG. 6 to which reference is now primarily directed. The received sum signal $(\vec{S})$ is down converted within mixer 80 with reference to signal $\omega_p$ supplied from pointing oscillator 68. The output signal from mixer 80 is processed by IF receiver 82 and then applied in parallel to right-left range control unit 84 and forward-aft control switch 86. In a similar manner, the difference signal $\vec{D}_A$ is processed by a mixer 88 and a receiver 90; and the difference signal $\vec{D}_C$ by a mixer 92 and a receiver 94.

As mentioned above, for the computation of the antenna alignment control signal (ALE) and the velocity signal ($V_a$), independent samples from different portions of the terrain are required. In the embodiment of FIG. 6, these independent samples are provided by squinting the transmitted beam in the forward and aft directions, and by range gating in the right and left directions. Beam squinting is implemented by beam squint network 96 which is controlled by beam position control unit 97. Squint network 96 provides preselected phase shifts to the transmission signals applied to antenna 10, through circulators 98, 100, and 102. Techniques for the squinting of a transmission beam, such as by the use of variable phase shifters in the paths of the signal components applied to different sections of the antenna, are well-known. In the embodiment of FIG. 6, for example, the beam 60 (FIG. 1) may be shifted on alternate transmissions between the forward and aft positions indicated in FIG. 7. As shown in FIG. 7, the beam is squinted toward the forward direction such that the 3 db portion of beam approximately coincides with the mechanical boresight direction of the antenna. Similarly, the beam is squinted in the aft dimension such that the 3 db portion of the beam is approximately coincident with the boresight position.

The output signals from receivers 82, 90 and 94 are applied in parallel to forward and aft processing channels 104 and 106 during the forward and aft beam positions, respectively. In other words, the three output signals from the IF receivers are applied to forward processing channel 104 during the forward beam squint position, and to aft processing channel 106 during the aft beam position.

The received output signals are also applied through range gate control unit 84 to a right processing channel 108 and to a left processing channel 110. The signals applied to the left channel 110 are processed by a range gate which is timed to commence slightly before the boresight range and to terminate at the boresight range. The signals gated to the right processing channel 108 are processed by a range gate which is initiated at approximately the boresight range and is terminated slightly after the boresight range. Although in the interest of maintaining the clarity of the drawings, only a single composite lead is shown connected to the input section of each of the processing channels it is noted that the signals $\bar{S}$, $\bar{D}_A$ and $\bar{D}_C$ are applied in parallel to each of the four processing channels.

Forward processing channel 104 comprises a signal conditioner unit 112 and a sampling and digitizer unit 114. Conditioner 112 translates the applied signals to baseband (carrier frequency is translated to DC) as well as transforming the signal information from the $\bar{S}$, $\bar{D}_A$ and $\bar{D}_C$ format into the form of $\bar{F}$, $\bar{A}$, $\bar{R}$ and $\bar{L}$ signals. This last listed group of signals represent the signal spinor associated with forward, aft, right and left halves of the antenna, respectively. The term signal spinor as used herein connotes the accumulation of the phasors which are representative of the signals reflected from the individual scatterers within the antenna beam.

The sampling digitizer unit 114 digitizes the signals $\bar{A}$, $\bar{R}$ and $\bar{L}$ and applies these signals to computer 116; and unit 114 also forms the signals $\bar{F}_C$ and $\bar{F}_{SC}$ which signals also applies to computer 116. $\bar{F}_C$ is the "collapsed" signal spinor associated with the forward half of the antenna as 3a was discussed above relative to FIG. 3. $\bar{F}_{SC}$ is the signal spinor associated with the forward half of the antenna "semi-collapsed" to the condition where the sin $\phi_s(\psi) \to \phi_s(\psi)$—i.e. the phase difference between the forward and aft signal spinors is reduced to a value such that the sine of the phase angle approximates the angle, e.g. $\phi_s(\omega) < 10°$. The signal $\bar{F}_{SC}$ is used as a normalizing term in the below described computations.

The collapsing function may be expressed as a phase modulation function in accordance with the equation $$\theta = -[2\pi T \Delta f - 2(1 - \cos 2\pi T_1 \Delta f)] \quad (1)$$

or in terms of time delay as $$\bar{F}_C(t) = \bar{F}(t-T) + j$$
$$[2\bar{F}(t-T) - \bar{F}(t-T+T_1) - \bar{F}(t-T-T_1)] \quad (2)$$

where $$T = \frac{d}{4V \sin \sigma_p}; \text{ and } T_1^2 = \frac{d\lambda ctno_p}{32\pi V^2 \sin^2 o_p} \quad (3)$$

and $$\sigma_p = \sin^{-1} \frac{V_a}{V} = \tan^{-1} \frac{V_a}{V_b}.$$

Computer 116 computes the values of T and $T_1$ so that the best null of the TDE signal (time delay error) is obtained; and supplies the timing signals $(t-T)$; $(t-T+T_1)$ and $(t-T-T_1)$ to digitizer unit 114 during each sampling period. For example, if the signals $\bar{A}$, $\bar{R}$ and $\bar{L}$ are sampled at time $t_s$ and the signal $\bar{F}_C$ at time $(t_s-T)$; $(t_s-T+T_1)$ and $(t_s-T-T_1)$ then the signal $\bar{F}_C(t_s)$ is computed in accordance with Equation (2) above. The signal $\bar{F}_{SC}$ may be computed in a similar manner to $\bar{F}_C(t_s)$ except that the collapsing time value is slightly different. For example, the value of T for computing $\bar{F}_{SC}$ may be 0.9 times the value used for computing $\bar{F}_S$. Therefore the output signal for the semicollapsed case maintains a small variation in phase angle between the fore and aft spinors (see FIG. 5c). This $\bar{F}_{SC}$ signal is used for normalization processing.

Computer 116 processes the signals from sampling digitizer 114 to form four demodulation product terms defined as:

DP1 = Re $[j\bar{F}_C\bar{A}^*]$

DP2 = Re $[\bar{F}_C\bar{A}^*]$

DP3 = Re $[j\bar{F}_{SC}\bar{A}^*]$

DP4 = Re $[j\bar{R}\bar{L}^*]$

DP1, the first demodulation product, is equal to the real part of the complex product of the unit operator j (equal to the $\sqrt{-1}$; the spinor $\bar{F}_C$ and the spinor $\bar{A}^*$. The asterisk indicates the complex conjugate of the term, i.e., if $\bar{A} = X + jY$ then $\bar{A}^* = X - jY$.

Two of the above defined demodulation products are used to compute the component terms of the doppler angle error signal (DAE) which controls the pointing oscillator 68, according to the following equation:

$$DAEX = \frac{DP1X}{DP2X};$$

where X indicates the forward, right, aft, and left channels. The composite DAE signal which controls pointing oscillator 68 is $DAE_{fore} + DAE_{right} + DAE_{aft} + DAE_{left}$. It will be noted that channels 106, 108 and 110 process the signals applied thereto, and produce demodulation products in an identical manner to that described for channel 104. The DAE signal is the sum of the component DAEX signals associated with each of the processing channels.

In a similar manner the time delay error signal (TDE) which is used to compute the time delay values T and $T_1$ is formed from the terms:

$$TDEX = \frac{DP1X}{DP3X}$$

where X indicates the forward and aft channels. The resultant TDE signal is equal to $TDE_{forward} - TDE_{aft}$.

The alignment error signal (ALE) which is used to control the roll gimbal so that the A axis of the antenna is in the plane defined by $\bar{V}_a$ and the boresight axis B, is equal to:

$$ALEX = \frac{DP1X}{DP4X}$$

where X indicates the forward and aft channels. The resultant ALE signals is equal to $ALE_{right} - ALE_{left}$.

Computer 116 computes the $V_a$ and $V_b$ terms in accordance with equations $$V_b = \frac{f_p - f_t}{2}; \text{ and } V_a = \frac{d}{4T};$$

where d/2 is the distance between the phase centers of the forward and aft sections of antenna 10.

For best performance of the system in accordance with the invention, it is desirable that compensation be provided for processing anomalies. For example, receiver relative gain and phase errors may be sensed by applying a periodic phase squint in the receiving microwave section of the system, such as by means of variable phase shifter, for example. The effect of this phase squint is then sensed in the output signals from receivers 82, 90 and 94 and used to control variable phase shifters and variable attenuators in the receiver channels so as to compensate for any amplitude and/or phase errors. The effect of the phase squint on the signals used for the computations may be removed in the signal conditioner units by proper signal processing.

Similarly, antenna anomalies may be reduced by measuring these anomalies during calibration flights and then programming compensation processing therefor.

Depending on the parameters of the system and the desired accuracy, it may be necessary to "collapse" the returns from a plurality of separate range resolution elements according to the above described SBV schema. The demodulation products associated with each of the plurality of range resolution processing units would then be used to generate aggregate error signals for estimating the parameters of the velocity vector. This approach, however, increases the hardware requirements of the system as a function of the number of range resolution elements processed.

One way to achieve the signal to noise ratio needed for a desired degree of accuracy, without increasing the signal processing hardware is to alternately transmit two types of pulses. One pulse has a width required for mapping ($\delta t$); the other, the width required for SBV motion compensation ($D \times \delta t$). Both pulses need to have the same pulse energy and for reasonable value of D this can be achieved with a single long pulse that is alternately coded for compression upon reception. The coded pulses are used for mapping to a time resolution of $\delta t$ and the uncoded pulses for estimating the SBV parameters. This approach has two disadvantages, however, first the required average transmitter power increases by a factor of two; and secondly the unambiguous range is reduced by a factor of two. However, the resulting hardware reduction could offset these disadvantages for some applications.

The compatibility of signal to noise requirements for synthetic array mapping and SBV motion compensation could also be met by using an auxiliary inertial measurement unit (IMU). Conventional doppler velocimeters are commonly used to damp the oscillations in the Schuler tuned inertial navigation loop. Since the SBV processor is faster and more accurate than conventional doppler radars it could be used to remove the level errors from the inertial platform and perform aerial gyrocompassing, as well as for velocity measurement. Such a mechanization would provide good terrestrial navigation capability which can be used to augment the estimate of $\vec{\Omega}$. Further, when the velocity vector is nearly horizontal as in the case of the above described system, it is possible to use doppler inertial interconnections to interpolate $V_b$, the boresight velocity, between SBV velocity estimates. In effect, the doppler inertial velocity mechanization would then have the short time response of accelerometers with the inherent accuracy of the SBV processor. A vertical accelerometer which uses the SBV to remove the average value of gravity can provide the same capability in the vertical dimension. Whenever the average velocity is nearly horizontal and the boresight does not drift radically, the interpolated values of the geodetic velocity vector can be rotated into the antenna coordinate system without contaminating the estimate of $V_b$ by the errors in $V_a$. Therefore, the interim values of $V_b$ can be used to control the frequency of the motion compensation oscillator directly.

The doppler inertial technique can be used in conjunction with either of the first two mentioned techniques for enhancing the signal to noise ratio of the processor; i.e., the plurality of range element processing technique, and the pulse compression technique. When used with the multiple range gate processor, the doppler inertial technique can be used to reduce the needed number of range elements processed. It also may be used to remove short term drifts in the boresight direction, such as those caused by radome anomalies and signal reflections from the aircraft.

The instantaneous boresight direction may be sensed from the difference between $V_b$ as measured by the processor 30, and the $V_b$ value from the inertial measurement unit; with the average boresight direction corresponding to the value from the inertial measurement unit. This difference signal between the just mentioned values of $V_b$ may be used to correct the missile guidance signal $\Delta AZ$.

Thus, there has been described a novel and improved missile guidance system capable of increased accuracy with reduced equipment complexity.

What is claimed is:
1. A synthetic array radar command air launched missile guidance system comprising:
   a. a four-quadrant antenna;
   b. a radar transmitter;
   c. a beam squint network fed by the four-quadrant antenna and the transmitter;
   d. a single beam velocimeter fed by the beam squint network and having a feedback to the beam squint network;
   e. a synthetic array data processor fed by the beam squint network;
   f. a map display fed by the synthetic array data processor;
   g. a motion compensation computer fed by the single beam processor;
   h. a roll servo control fed by the motion compensation computer and feeding the four-quadrant antenna;
   i. a motion compensation oscillator fed by the motion compensation computer and feeding the synthetic array data processor;
   j. a terrestrial navigation system feeding the motion compensation computer;
   k. a summation circuit fed by the motion compensation computer;
   l. a boresight gyro fed by the motion compensation computer and the summation circuit;
   m. means for coordinate transforming fed by the boresight gyro;
   n. an azimuth servo control fed by the coordinate transforming means and feeding the four-quadrant antenna; and
   o. an elevation servo control fed by the coordinate transforming means and feeding the four-quadrant antenna.
2. A synthetic array radar command air launched missile system according to claim 1 which further comprises:
   a. a missile signal processor fed by the synthetic array data processor; and
   b. a missile command coder fed by the missile signal processor and feeding the synthetic array data processor.

* * * * *